(12) United States Patent
Glade et al.

(10) Patent No.: US 8,151,021 B1
(45) Date of Patent: Apr. 3, 2012

(54) UPGRADING SOFTWARE ON A CLUSTER OF COMPUTERIZED DEVICES

(75) Inventors: Bradford B. Glade, Harvard, MA (US); Nathan Bullock, Kitchener (CA); Ronald Dale Hagglund, Edmonton (CA)

(73) Assignee: EMC Corporation, Hopkinton, MA (US)

( * ) Notice: Subject to any disclaimer, the term of this patent is extended or adjusted under 35 U.S.C. 154(b) by 37 days.

(21) Appl. No.: 12/751,155

(22) Filed: Mar. 31, 2010

(51) Int. Cl.
  *G06F 13/12* (2006.01)
  *G06F 13/38* (2006.01)
(52) U.S. Cl. ......................................................... 710/62
(58) Field of Classification Search ....................... 710/62
  See application file for complete search history.

(56) References Cited

U.S. PATENT DOCUMENTS

| | | | |
|---|---|---|---|
| 6,496,914 B1 | 12/2002 | Vook et al. | |
| 6,665,703 B1 | 12/2003 | Shatil et al. | |
| 6,681,390 B2 | 1/2004 | Fiske | |
| 6,684,396 B1 * | 1/2004 | Brittain et al. | 717/168 |
| 7,543,019 B1 | 6/2009 | Cormier | |
| 7,890,664 B1 | 2/2011 | Tao et al. | |
| 2004/0148598 A1 * | 7/2004 | Kita et al. | 717/170 |
| 2005/0010532 A1 * | 1/2005 | Garibay et al. | 705/59 |
| 2005/0125461 A1 * | 6/2005 | Filz | 707/203 |
| 2005/0165760 A1 * | 7/2005 | Seo | 707/3 |
| 2006/0294413 A1 * | 12/2006 | Filz et al. | 714/4 |
| 2007/0299904 A1 * | 12/2007 | Springer et al. | 709/200 |
| 2008/0172300 A1 * | 7/2008 | Karki et al. | 705/26 |

* cited by examiner

*Primary Examiner* — Chun-Kuan Lee
*Assistant Examiner* — Ronald Modo
(74) *Attorney, Agent, or Firm* — BrainwoodHuang (57) ABSTRACT

A technique for upgrading software running on a cluster of computerized nodes. The technique involves running a first version of the software on each node of the cluster. The technique further involves installing a second version of the software on each node in place of the first version of the software during an installation period and after running the first version of the software on each node. The second version of the software installed on each node includes a first version side and a second version side. At least one node of the cluster runs (i) the first version of the software or (ii) the first version side of the second version of the software at all times during the installation period. The technique further involves running the second version side of the second version of the software on each node of the cluster after the installation period.

20 Claims, 9 Drawing Sheets

```
┌─────────────────────────────────────────────────────────┐
│ RUN A FIRST PACKAGE OF THE SOFTWARE (E.G., A LEGACY     │
│ SOFTWARE PACKAGE OR RELEASE) ON EACH COMPUTERIZED       │
│ NODE OF THE CLUSTER (E.G., A CLUSTERED BLOCK STORAGE    │
│ SYSTEM)                                                  │──── 62
└─────────────────────────────────────────────────────────┘
                              │
                              ▼
┌─────────────────────────────────────────────────────────┐
│ DURING AN INSTALLATION PERIOD AND AFTER RUNNING THE     │
│ FIRST SOFTWARE PACKAGE ON EACH COMPUTERIZED NODE        │
│ FOR A PERIOD OF TIME, INSTALLING A SECOND SOFTWARE      │
│ PACKAGE (E.G., A HYBRIDIZED SOFTWARE PACKAGE OR         │
│ RELEASE) ON EACH COMPUTERIZED NODE OF THE CLUSTER       │
│ IN PLACE OF THE FIRST SOFTWARE PACKAGE, THE SECOND      │
│ SOFTWARE PACKAGE INCLUDING A FIRST VERSION SIDE (I.E.,  │
│ AN "A-SIDE" CORRESPONDING TO THE FIRST SOFTWARE         │
│ PACKAGE) AND A SECOND VERSION SIDE (I.E., A "B-SIDE"), AT│
│ LEAST ONE COMPUTERIZED NODE OF THE CLUSTER RUNNING      │
│ (I) THE FIRST SOFTWARE PACKAGE OR (II) THE "A-SIDE" OF  │
│ THE SECOND SOFTWARE PACKAGE AT ALL TIMES DURING THE     │
│ INSTALLATION PERIOD                                      │──── 64
└─────────────────────────────────────────────────────────┘
                              │
                              ▼
┌─────────────────────────────────────────────────────────┐
│ AFTER THE INSTALLATION PERIOD, RUNNING THE SECOND       │
│ VERSION SIDE OF THE SECOND SOFTWARE PACKAGE (I.E.,      │
│ "B-SIDE") ON EACH COMPUTERIZED NODE OF THE CLUSTER      │──── 66
└─────────────────────────────────────────────────────────┘
```

UPGRADING SOFTWARE ON A CLUSTER OF COMPUTERIZED DEVICES

BACKGROUND

A conventional data storage system includes a data storage device and a storage array. During operation, the data storage device receives input/output (I/O) requests from external hosts, and loads data from and stores data into the storage array in response to the I/O requests.

Some data storage systems include redundant data storage devices which operate in a coordinated manner as a data storage cluster. As a result, the data storage devices are able to load balance the processing of I/O requests (i.e., distribute the I/O workload across devices), and provide fault tolerance in the event of a device failure (i.e., if one device were to fail, it may be possible for another device to continue operation).

On occasion, the data storage system may require a software upgrade. Such an upgrade may fix software bugs and/or improve the operating efficiency of the data storage system.

SUMMARY

Improvements can be made to the above-described conventional data storage system. For example, typical software upgrades require protocol version interoperability. As a result, the data storage system may be able to provide continued service during the process of upgrades.

Unfortunately, the requirement of full protocol version interoperability between all cluster members adds complexity to the software development/upgrade process. Along these lines, the upgrade process introduces greater risk or exposure since it eliminates operational redundancy during the upgrade. Furthermore, complexities of achieving version interoperability increases the likelihood that a hidden software defect may cause the system to suffer a software malfunction, and perhaps a loss of system availability, during the upgrade process.

In contrast to the above-described conventional approaches, improved techniques involve upgrading a computer using a hybridized package (or release) of software which is capable of running in accordance with either an original "A" version or a new "B" version. In particular, once the software package is installed on a computer, the computer can run the new "B" version or revert back to running the original "A" version. Additionally, in the context of data storage, the computer is capable of running the new "B" version for some external hosts, and the original "A" version for other external hosts (e.g., on a per group basis). Furthermore, the software package is well-suited for safely and methodically upgrading a cluster of two or more nodes while the cluster as a whole remains online. Moreover, when the computer includes more than two nodes, the techniques preserve operational redundancy through the upgrade process.

One embodiment is directed to a method of upgrading software running on a cluster of computerized nodes. The method includes running a first package of the software on each computerized node of the cluster, the first software package having a first "A" version. The method further includes installing a second package of the software on each computerized node of the cluster in place of the first software package during an installation stage (or period) and after running the first software package on each computerized node of the cluster for a period of time. The second software package installed on each computerized node of the cluster includes a first "A" version side (or simply "A-side") corresponding to the first "A" version of the first software package and a second "B" version side (or simply "B-side"). At least one computerized node of the cluster runs (i) the first "A" version of the first software package or (ii) the "A-side" of the second software package at all times during the installation period. The method further includes running the "B-side" of the second software package on each computerized node of the cluster after the installation period (e.g., after atomically switching from the A-side" to the "B-side"). Accordingly, at all times, the I/O requests from a given host can be serviced by nodes that process the I/O requests through the same version of the protocol stack.

Another embodiment is directed to a clustered storage system which includes computerized nodes constructed and arranged to upgrade software in the manner described above. Yet another embodiment is directed to a computerized device which upgrades software in the manner described above. Furthermore, another embodiment is directed to a computer program product having a computer readable storage medium which upgrades software in the manner described above.

In some arrangements, the software packages running on the computerized devices are software images which direct the computerized devices to operate as data storage nodes of a clustered block storage system. In these arrangements, the computerized devices, when running the software, receive I/O requests from a set of external host devices and perform I/O operations on a storage assembly (e.g., one or more storage arrays) based on the I/O requests.

In some situations, an external host device may have a single path to a computerized node. Nevertheless, if the hybridized package is installed on that computerized node, the hybridized package supports the ability to non-disruptively upgrade an I/O stack while the host device continues to receive service from the computerized node.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique upgrades a computer to a hybridized package (or release) of software which is capable of running in either an original manner or a new manner (e.g., to fix software bugs, to improve efficiency, etc.). Once the hybridized software package is installed on a computer, the computer can run in the new manner or revert back to running in the original software package. Additionally, in the context of data storage, the computer (e.g., a data storage node) is capable of running in the new manner for some external hosts, and in the original manner for other external hosts (e.g., on a per group basis). Moreover, the hybridized software package is well-suited for safely and effectively upgrading a cluster of more than two computerized devices while the cluster remains online at all times. In particular, in a cluster of computerized devices, operational redundancy is preserved across the cluster during the upgrade process.

Figure 1:
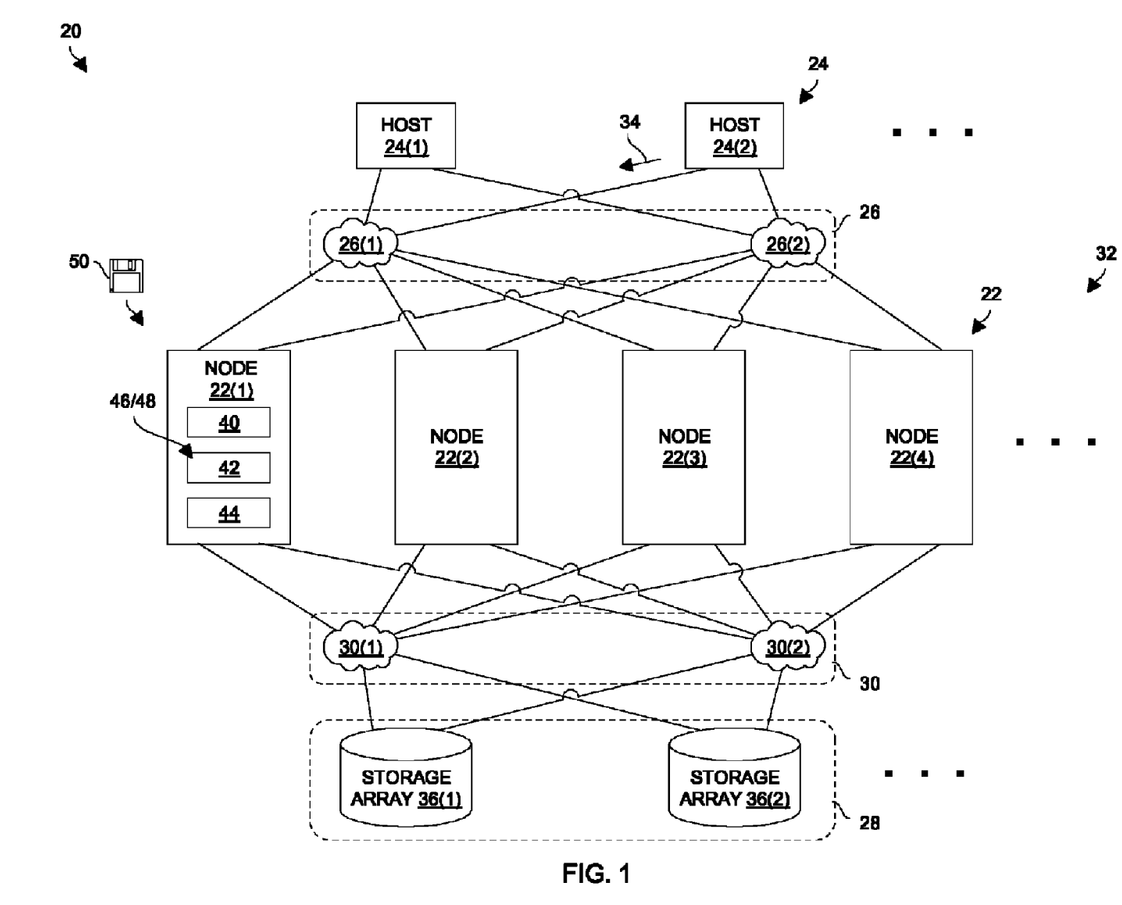
FIG. 1 is a block diagram of a cluster of computerized devices which undergoes a software upgrade using a hybridized package of the software.

FIG. 1 shows a data storage environment 20 having a set of computerized nodes 22(1), 22(2), 22(3), 22(4), . . . (collectively computerized nodes 22) which undergoes an upgrade to a hybridized package of software. The data storage environment 20 includes a set of external host devices 24(1), 24(2), . . . (collectively, external host devices 24), and a host-side storage fabric 26 which connects the external host devices 24 to the set of computerized nodes 22. The data storage environment 20 further includes a storage assembly 28, and an array-side storage fabric 30 which connects the set of computerized nodes 22 to the storage assembly 28.

It should be understood that the computerized nodes 22 coordinate their operation among each other thus forming a clustered storage system 32 which is well suited for load balancing the processing of input/output (I/O) requests 34 from the external host devices 24. Due to redundancy, the clustered storage system 32 is able to continue processing I/O requests 34 even if one or more computerized nodes 22 were to go offline (e.g., during maintenance, due to a failure of a particular computerized node 22, etc.). Along these lines, as long as at least one computerized node 22 remains online, the clustered storage system 32 is capable of responding to I/O requests 34 from the external hosts 24.

For load balancing and fault tolerance purposes, the host-side storage fabric 26 includes multiple networks 26(1), 26(2), . . . to provide multiple I/O paths between each external host device 24 and the set of computerized node 22. Similarly, the array-side storage fabric 30 includes multiple networks 30(1), 30(2), . . . to provide multiple I/O paths between the set of computerized nodes 22 and the storage assembly 28. In some arrangements, the storage assembly 28 includes mirroring storage arrays 36(1), 36(2), . . . for additional fault tolerance.

It should be understood that each computerized node 22 is preferably a self-contained (or standalone) computerized device having a network interface 40, memory 42 and processing circuitry 44 (e.g., see details in the computerized node 22(1)). The network interface 40 (e.g., a network interface card, a host adaptor, etc.) is constructed and arranged to provide the computerized node 22 with external access. The memory 42 is constructed and arranged to store software 46 (e.g., upgradable software images, upgrade routines, system management GUIs, other administrative tools, etc.) and cache host data 48 en route between the external hosts 24 and the storage assembly 28. The processing circuitry 44 (e.g., a microprocessor, a set of processors, etc.) is constructed and arranged to execute specialized data storage software stored in the memory 42 in order to carry out load and store operations on behalf of the external host devices 24.

It should be further understood that any of the software 46 is capable of being delivered to and installed on the computerized nodes 22 from a computer program product 50 (illustrated generally by a diskette icon 50). Such a computer program product 50 includes a non-transitory computer readable storage medium which stores instructions that are executed by the processing circuitry 44. Examples of suitable computer readable storage media include CD-ROM, flash memory, disk memory, tape memory, and so on. Further software upgrade details will now be provided with reference to FIG. 2.

Figure 2:
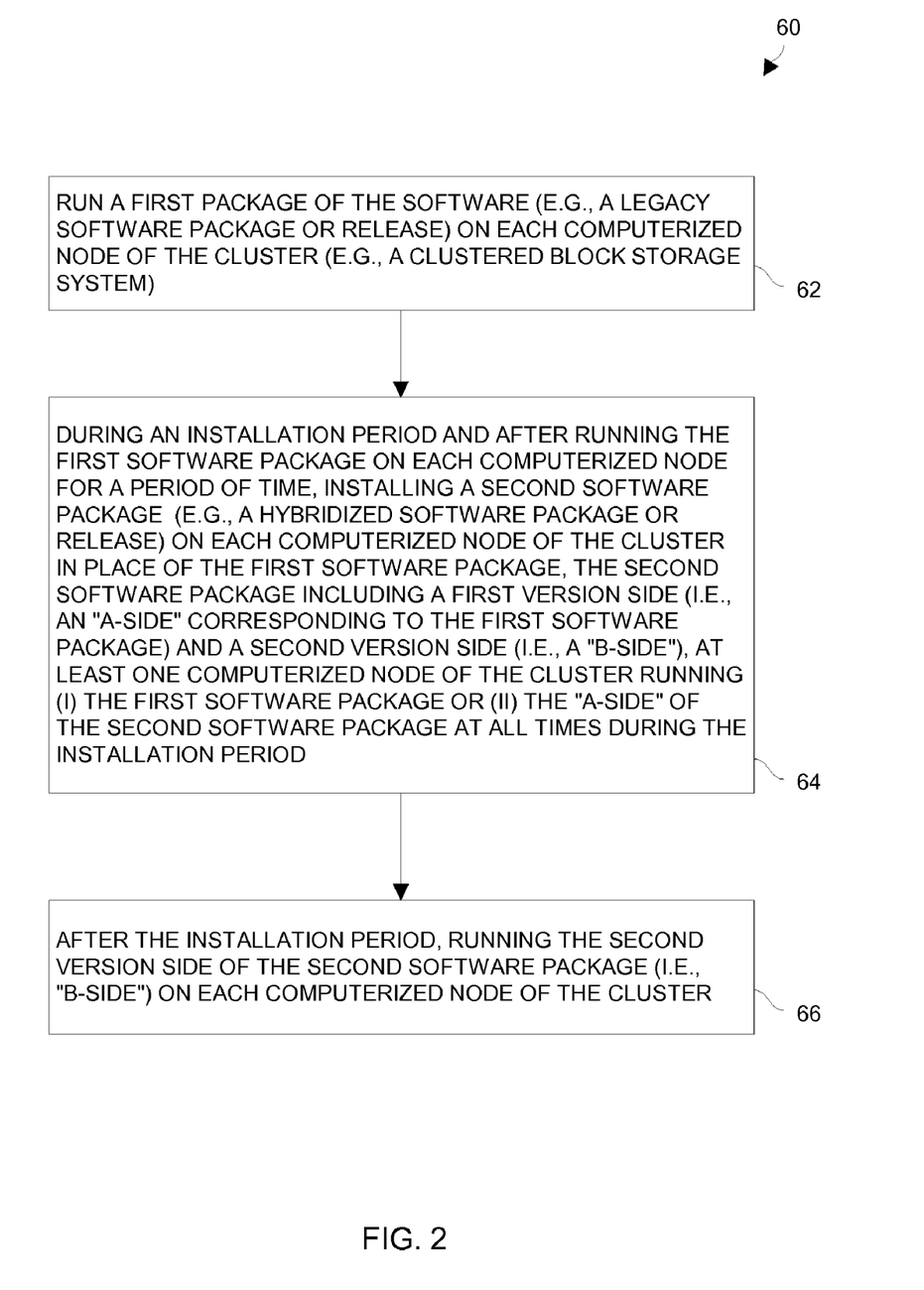
FIG. 2 is a flowchart of a procedure for upgrading the cluster of computerized devices to the hybridized package of the software while the cluster, as a whole, remains online to perform useful work.

FIG. 2 shows a procedure 60 which is performed by the set of computerized nodes 22 forming the clustered storage system 32 (FIG. 1) when upgrading software running while the system 32 as whole remains online. By way of example, the software that is undergoing the upgrade is the data storage software which is responsible for performing the data storage operations on behalf of the external host devices 24.

In step 62, the computerized nodes 22 run a first package of the software which is initially stored in their memories 42 (also see FIG. 1). During this time, the set of computerized nodes 22 perform I/O operations in accordance with the first release of the software (e.g., see the I/O requests 34 in FIG. 1). The first software package may be a legacy package (or release) of the software that originally shipped with the computerized nodes 22 and/or has been in place to direct the operation of the system 32 for a significant amount of time.

In step 64, each computerized node 22 is individually brought offline (i.e., to a state in which the node 22 no longer processes I/O requests), installed with a second hybridized package of the software, and brought back online (i.e., to a state in which the node 22 processes I/O requests) running the second software package. During this installation stage, the processing circuitry 44 of the computerized nodes 22 preferably runs an upgrade routine to (i) receive the second software package of the software through the network interfaces 40 and (ii) install the second software package of the software in the memories 42 in place of the first software package. This replacement package is hybridized in that it includes a first version side (or "A-side") and a second version side (or "B-side") and, during this installation time period, at least one computerized node 22 runs (i) the first software package or (ii) the "A-side" of the second software package at all times. The "A-side" processes I/O requests in the same manner as the first software package. Along these lines, at no time are the I/O requests 34 from a given host device 24 (or a given group of host devices 24) serviced by computerized nodes 22 that process the I/O requests 34 through different versions of the protocol stack. Accordingly, during this installation time period, the system 32 as a whole continues to reliably process I/O requests 34 (i.e., at least one computerized node 22 remains online and operates in accordance with the first software package or in accordance with the "A-side" of the second software package).

It should be understood that, during the installation period, the clustered storage system 32 can transition entirely (i.e., atomically switch) between I/O protocol stacks of different versions for a given host device 24 or group of host devices 24. Along these lines, the computerized nodes 22 hold processing of new I/O requests 34 and drain (i.e., complete) I/O requests 34 which are in progress under the "A-side" of the protocol stack before beginning operation in accordance with the "B-side" of the second software package. During this time, the clustered storage system 32 can continue to process I/O requests 34 for other host devices 24 or groups under the "A-side" of the protocol stack.

Such a transition to the B-side" of the protocol stack for a given host device 24 or group may depend on the perceived risk associated with the transition, and can be carried out in an automated manner or under close user supervision. Additionally, provided that the second software package is provisioned to convert information back in a manner that is compatible with the "A-side", the computerized nodes 22 are capable of reverting back to running the "A-side" after running the "B-side" for a period of time. Moreover, the computerized nodes 22, which have the second software package installed, can run the "A-side" for some external host devices 24 (e.g., one group of hosts) and the "B-side" for other external host devices 24 (e.g., another group of hosts).

In step 66, after the installation period, all of the computerized nodes 22 run the "B-side" of the second software package. Accordingly, the upgrade of the software to the second software package is now complete. Further details will now be provided with reference to FIG. 3.

Figure 3:
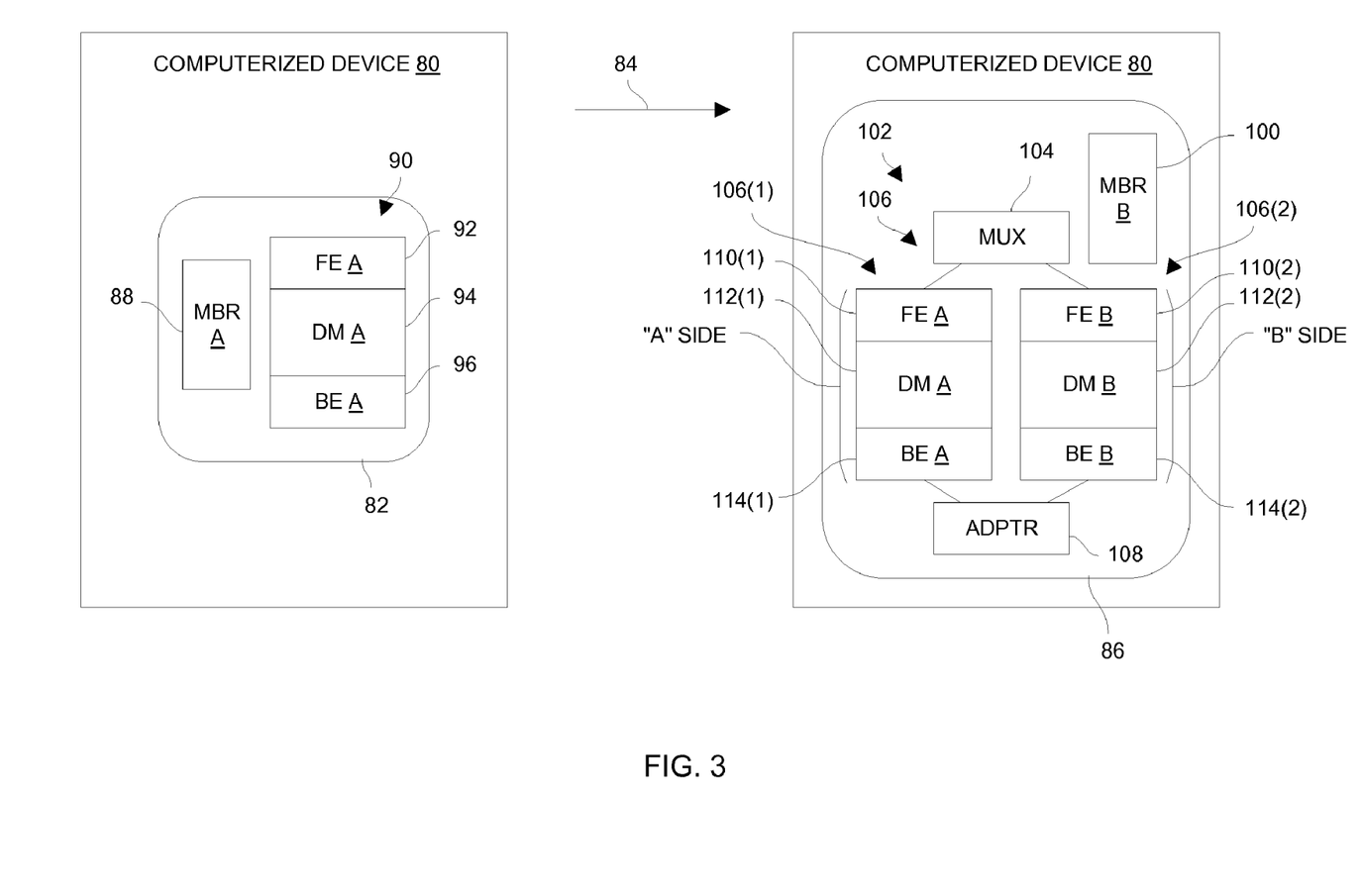
FIG. 3 is a block diagram which illustrates a transition of a computerized device from running a legacy package of the software to the hybridized package of the software.

FIG. 3 shows a computerized device 80 which represents a computerized node 22 of the clustered storage system 32 of FIG. 1. Recall that the computerized node 22 includes a network interface 40 for external access, memory 42 for storing software 46 and cached host data 48, and processing circuitry 44 for executing the software 46. Accordingly, the computerized device 80 is well equipped to perform I/O operations on behalf of the set of external host devices 24 (FIG. 1).

As shown in FIG. 3, the computerized device 80 initially runs a legacy package 82 of data storage software (i.e., a first software package or release) when performing the host I/O operations. The legacy software package 82 includes an "A-side" of the protocol stack.

Following a local upgrade (illustrated by the arrow 84), the computerized device 80 subsequently runs a hybridized package 86 of the data storage software (i.e., a replacement software package or release) when performing the host I/O operations. The hybridized software package 86 includes (i) the "A-side" of the protocol stack which matches the "A-side" of the protocol stack of the legacy software package 82 as well as (ii) a "B-side" of the protocol stack which is different than the "A-side" of the protocol stack of the legacy software package 82.

As further shown in FIG. 3, the legacy software package 82 is clearly not hybridized. Rather, the legacy software package 82 simply includes a membership portion 88 and an I/O stack 90. The membership portion 88 includes instructions (i.e., executable code) which are responsible for coordinating operation among the computerized nodes 22 of the clustered storage system 32 (also see FIG. 1), and for ensuring consistent transitions between versions of the I/O stacks. It should be understood that, for illustration purposes only, the membership portion 88 of the legacy software package 82 is labeled as version "A", i.e., the membership portion 88 operates in accordance with version "A" features.

The I/O stack 90 of the legacy software package 82 includes a front-end portion 92, a data-management portion 94, and a back-end portion 96. These various portions 92, 94, 96 of the I/O stack 90 include instructions which are responsible for moving host data 48 (FIG. 1) within the clustered storage system 32 in response to I/O requests 34 from the external host devices 24. In particular, the front-end portion 92 moves host data 48 between the external host devices 24 and a designated cache portion of the memory 42. The back-end portion 96 moves the host data 48 between the designated cache portion of the memory 42 and the storage assembly 28 (also see FIG. 1). The data-management portion 94 implements cache consistency protocols and mirrors the host data 48 to the designated portion of memory 42 of another computerized device 80 (e.g., to provide fault tolerance when performing write-back caching). Again, for illustration purposes only, the various portions 92, 94, 96 of the legacy software package 82 are labeled as version "A", i.e., the various portions 92, 94, 96 operate in accordance with version "A" features.

The hybridized software package 86 includes a membership portion 100 and an I/O portion 102 having multiple I/O stacks. In a manner similar to that of the membership portion 88 of the legacy software package 82, the membership portion 100 of the hybridized software package 86 includes instructions which are responsible for determining which computerized nodes 22 form the clustered storage system 32. For illustration purposes only, the membership portion 100 of the hybridized software package 86 is labeled as version "B", i.e., the membership portion 100 of the hybridized software package 86 operates in accordance with version "B" features. It should be understood that the complexity of the membership portion 100 may need to be increased if the membership portion 100 is to support version "B" features as well as version "A" features for backwards compatibility.

The I/O portion 102 includes a multiplexer portion 104, multiple I/O stacks 106(1), 106(2) (collectively, I/O stacks 106) and an adapter portion 108. The I/O stack 106(1) (i.e., the "A-side") includes a front-end portion 110(1), a data-management portion 112(1), and a back-end portion 114(1). These various portions 110(1), 112(1), 114(1) of the I/O stack 106(1) include instructions which are responsible for moving host data 48 (FIG. 1) within the clustered storage system 32 in response to I/O requests 34 from the external host devices 24 in accordance with version "A" features. That is, the front-end portion 110(1) operates in the same manner as the front-end portion 92 of the legacy software package 82 (i.e., to move host data 48 between the external host devices 24 and the designated cache portion of the memory 42). Similarly, the data-management portion 112(1) operates in the same manner as the data-management portion 94 of the legacy software package 82 (i.e., to mirror host data 48 to the designated cache portion of memory 42 of another computerized device 80). Likewise, the back-end portion 114(1) operates in the same manner as the back-end portion 96 of the legacy software package 82 (i.e., to move host data 48 between the designated cache portion of the memory 42 and the storage assembly 28).

The I/O stack 106(2) (i.e., the "B-side") includes a front-end portion 110(2), a data-management portion 112(2), and a back-end portion 114(2). In contrast to components of the I/O stack 106(1), the various portions 110(2), 112(2), 114(2) of the I/O stack 106(2) include instructions which are responsible for moving host data 48 (FIG. 1) within the clustered storage system 32 in response to I/O requests 34 from the external host devices 24 in accordance with version "B" features. In particular, the front-end portion 110(2) moves host data 48 between the external host devices 24 and a designated cache portion of the memory 42. The back-end portion 114(2) moves the host data 48 between the designated cache portion of the memory 42 and the storage assembly 28. The data-management portion 112(2) mirrors the host data 48 to the designated cache portion of memory 42 of another computerized device 80.

The multiplexer portion 104 links to both I/O stacks 106(1), 106(2), and operates as an interface to the external host devices 34. Along these lines, the multiplexer portion 104 is capable of channeling I/O requests 34 from the external host devices 24 to either I/O stack 106. For example, the multiplexer portion 104 is responsive to configuration commands (i.e., command signals or configuration parameters) and can steer all I/O requests 34 to the I/O stack 106(1) (i.e., the "A-side") or to the I/O stack 106(2) (i.e., the "B-side") based on the configuration commands (such commands may be internal to the system and controlled by the software which is responsible for automating the upgrade). As another example, the multiplexer portion 104 is capable of selectively steering I/O requests 34 to either the I/O stack 106(1) (i.e., the "A-side") or the I/O stack 106(2) (i.e., the "B-side") based on the source the I/O requests 34 (e.g., based on a host identifier in each I/O request 34, also see FIG. 1).

The adapter portion 108 links to both I/O stacks 106(1), 106(2) as well and operates as an interface to the storage arrays 36 of the storage assembly 28. That is, the adapter portion 108 is capable of transferring host data 48 between the cache portion of the memory 42 and the storage assembly 28 (i.e., storing and retrieving host data 48) from through either the version "A" side or the version "B" side of the I/O portion 102 of the hybridized software package 86.

At this point, it should be understood that there no need for any of the various portions 110(2), 112(2), 114(2) of the I/O stack 106(2) to be backwards compatible with version "A". Rather, these portions 110(2), 112(2), 114(2) are capable of being extremely optimized and specialized to only the version "B" features since the version "A" features are available via portions 110(1), 112(1), 114(1). Further details of the upgrade process will now be provided with reference to an example which references FIGS. 4 through 7.

FIGS. 4 through 7 illustrate an upgrade process which is applied to a clustered storage system 32 which is formed by a set of four computerized nodes 22(1), 22(2), 22(3), 22(4). In particular, suppose that each computerized node 22 initially runs a legacy version "A" image (also see the legacy package 82 of the data storage software in FIG. 3), but must be upgraded to run a new release image (also see the hybridized software package 86 in FIG. 3).

Figure 4:
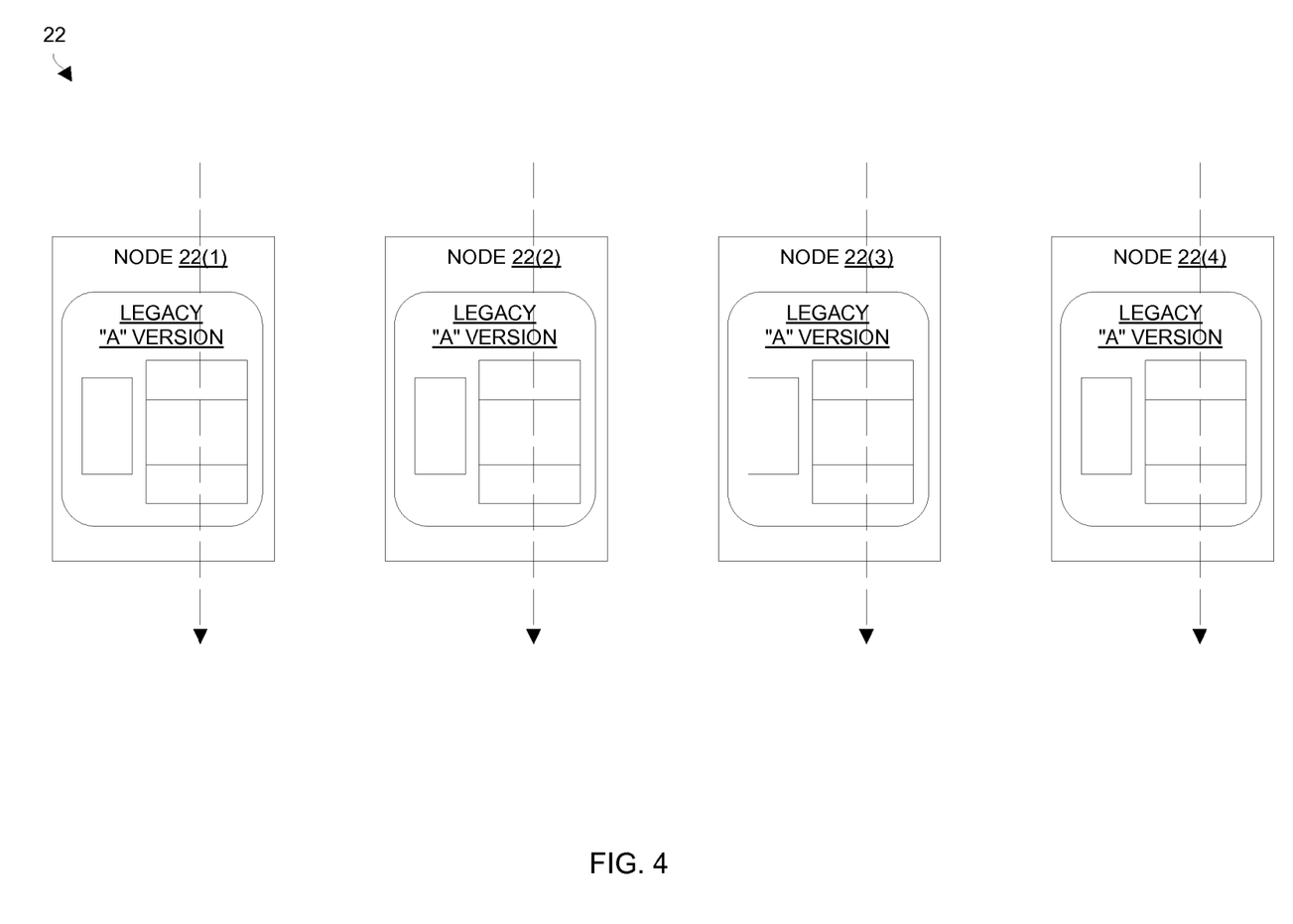
FIG. 4 is a block diagram showing computerized nodes of a clustered storage system at an initial point in time.

As shown in FIG. 4, each computerized node 22 shares the cluster workload by processing I/O requests 34 from external host devices 24 (FIG. 1) initially in accordance with version "A" features provided by the legacy software package 82 (also see step 62 in FIG. 2). In this situation, multiple I/O paths exist between the external host devices 24 and the storage assembly 28 through the set of computerized nodes 22 (see multiple dashed lines in FIG. 4). As a result, one or more of the computerized nodes 22 may go offline (e.g., during a maintenance activity, due to a failure, etc.) but the clustered storage system 32 may remain operational as a whole. That is, as long as at least one I/O path exists between an external host device 24 and the storage assembly 28 through the set of computerized nodes 22, the clustered storage system 32 is able to properly respond to I/O requests 34 from that external host device 24. FIG. 1 shows a well-structured topology that continues to provide an I/O path to each external host device 24 even when all but one computerized device 22 has gone offline, i.e., only computerized device 22 must remain online for the cluster 32 to continue processing host I/O operations.

Figure 5:
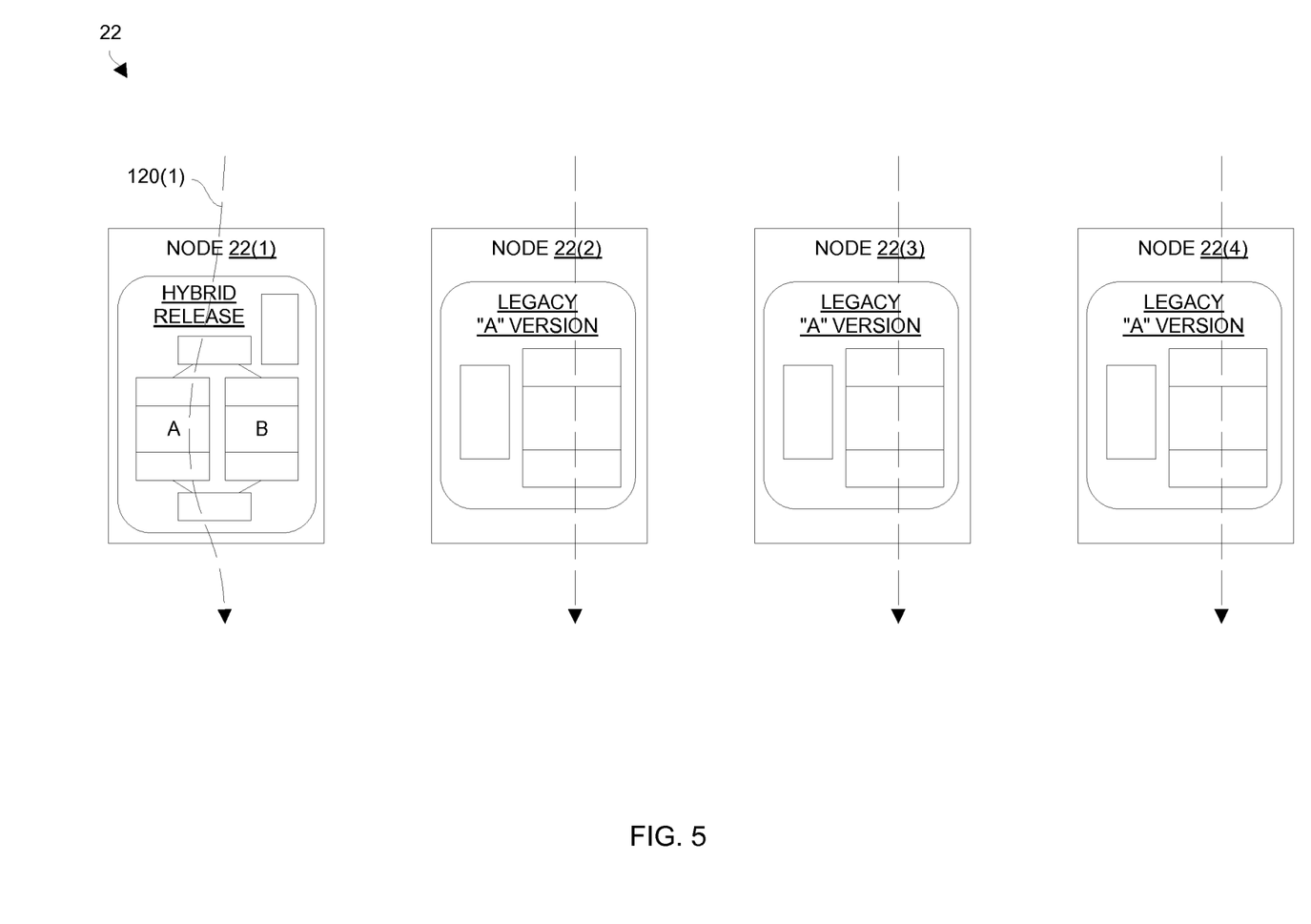
FIG. 5 is a block diagram showing the computerized nodes of the clustered storage system of FIG. 4 during an early portion of an upgrade process.

As shown in FIG. 5, to begin the upgrade process, the computerized node 22(1) is taken offline and the new hybridized software package 86 (i.e., a new software release) is installed in place of the legacy software package 82 (also refer back to FIG. 4). During this time, the remaining computerized nodes 22(2), 22(3), 22(4) remain online to continue performing host I/O operations. If the storage fabric 26, 30 is properly structured (e.g., see FIG. 1), the lost participation of the computerized node 22(1) does not result in a significant performance drop by the clustered storage system 32 (e.g., a loss of only 25% of the cluster's maximum capacity in the context of one of four nodes 22 going offline).

The computerized node 22(1) is then brought back online but now runs the hybridized software package 86 which is installed in place of the legacy software package 82. In particular, in response to an "A-side" command" (e.g., a user entered instruction, a configuration parameter, etc.) the computerized node 22(1) processes host I/O operations through the version "A" side of the hybridized software package 86 (also see the I/O stack 106(1) in FIG. 3). This "A-side" processing is illustrated by the curved dashed arrow 120(1) in FIG. 5. As a result, all of the computerized nodes 22 are once again operational, and the clustered storage system 32 enjoys full load balancing and fault tolerance capabilities as it did prior to the upgrade of the computerized node 22(1) (also see FIG. 4).

Figure 6:
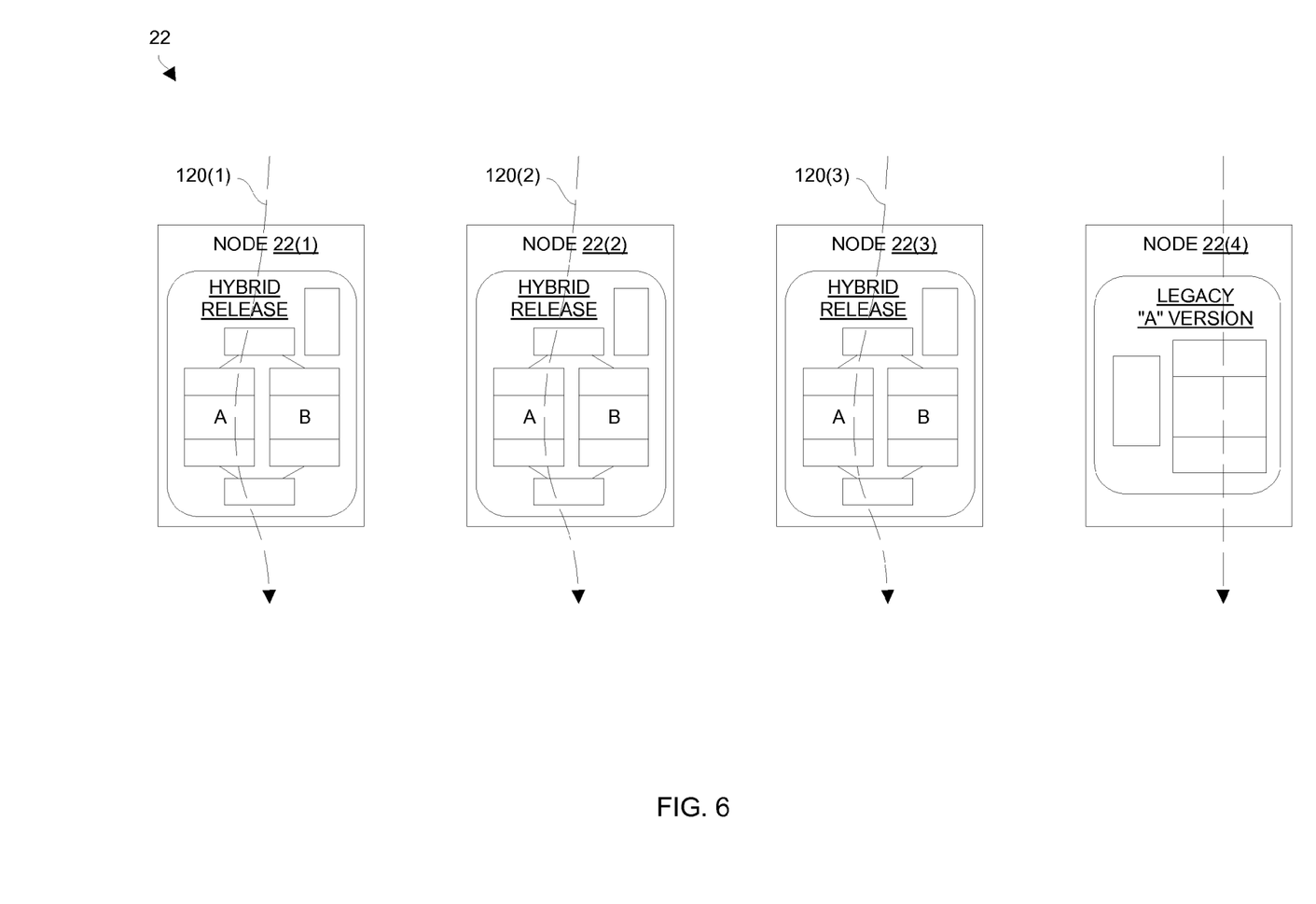
FIG. 6 is a block diagram showing the computerized nodes of the clustered storage system of FIG. 4 during a later portion of the upgrade process.

As shown in FIG. 6, the upgrade process continues by repeating the incremental upgrading of each computerized node 22 from the legacy software package 82 to the hybridized software package 86. That is, each of the remaining computerized nodes 22 is brought offline one at a time while the other computerized nodes 22 remain online, the hybridized software package 86 is installed in place of the legacy software package 82 on that node 22, and that node 22 is brought online again but now running the "A-side" of the hybridized software package 86. As a result, the computerized nodes 22(1), 22(2), 22(3) steer I/O processing through the "A-side" of the hybridized version "B" of the software as illustrated by the dashed arrows 120(1), 120(2), 120(3), respectively, in FIG. 5.

It should be understood that, for each host device 24 or group, the computerized nodes 22 are consistent in processing I/O requests 34 from the same version of the protocol stack, e.g., running either the "A-side" or the "B-side" for a given host device 24 or group. That is, at no time are the I/O requests 34 from a given host device 24 serviced by nodes 22 that process the I/O requests 34 through different versions of the protocol stack. Accordingly, from the perspective of the set of external host devices 24, the clustered storage system 32 reliably remains continuously up and running in a high availability manner (also see step 64 in FIG. 2).

Figure 7:
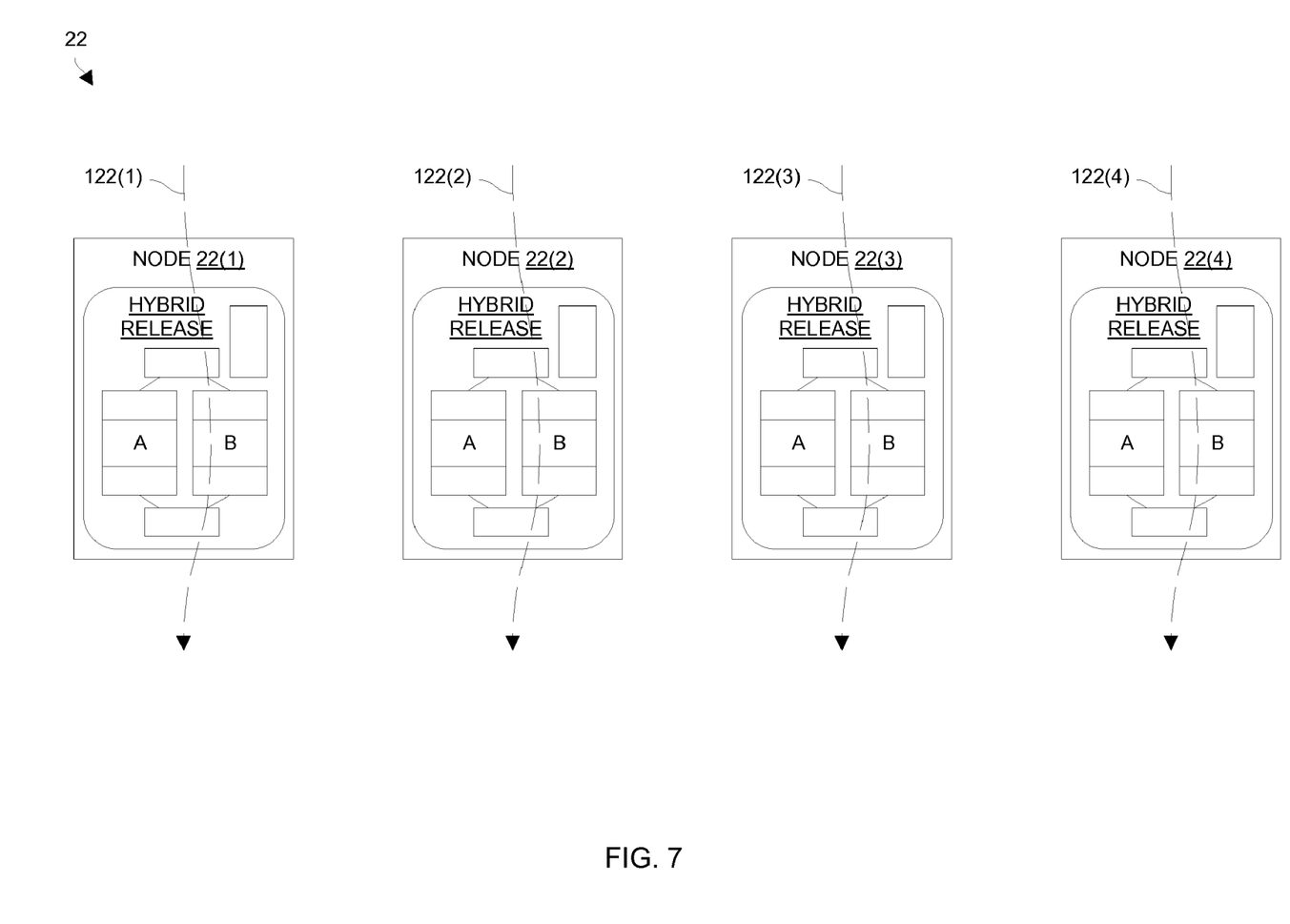
FIG. 7 is a block diagram showing the computerized nodes of the clustered storage system of FIG. 4 after completion of the upgrade process.

As shown in FIG. 7, the last node 22 to be upgraded with the hybridized software package 86 is the computerized node 22(4). Once the computerized node 22(4) is upgraded, each computerized node 22 is capable of performing host I/O operations using the "A-side" for an extended period of time thus provide utmost flexibility during the installation period. That is, even though the hybridized software package 86 is now running on each computerized node 22, the computerized nodes 22 can continue "A-side" processing indefinitely.

At some point, however, depending on the risk associated with transitioning external host devices 24 to using the version "B" features, processing is switched from "A-side" processing to "B-side" processing. For example, the transition may occur gradually in the sense that not all host devices 24 need to transition between protocol versions at the same time. Rather, a given host device 24 (or group) can transition between versions of the I/O stack as long as all nodes 22 transition between protocol versions concurrently and consistently across the cluster 32.

It should be understood that, when the computerized nodes 22 switch from "A-side" processing to "B-side" processing, the "A-side" I/O stack is preferably drained of its I/O operations prior to "B-side" processing. That is, the computerized nodes 22 receive, but queue new I/O requests 34 from the external host devices 24 while the various components of the "A-side" I/O stack finish responding to any I/O requests 34 which already had been received and started. Next, a conversion routine converts any host data 48 and control structures in the memory 42 to comply with the "B-side" I/O stack (e.g., stack state, cache state, etc.). The I/O requests 34 must be queued in a manner that their queuing time is within the expected processing time allowed by the host devices 24. Critical to this time is the time is takes to (i) drain the I/O requests 34 on the original I/O stack and (ii) convert the relevant state from the old stack to the new stack. By supporting the ability to perform this transition independently in discrete collections of host devices 24, the processing time is minimized allowing this activity to occur within the time constraints.

Finally, the computerized nodes 22 process the queued I/O requests 34 perform "B-side" processing. At this point, the clustered storage system 32 again enjoys full load balancing and fault tolerance capabilities as it did prior to the start of the upgrade but now with the I/O paths 122(1), 122(2), 122(3), 122(4) exclusively through the "B-side" I/O stacks of the hybridized software package 86 as shown in FIG. 7. Further details will now be provided with reference to FIG. 8.

Figure 8:
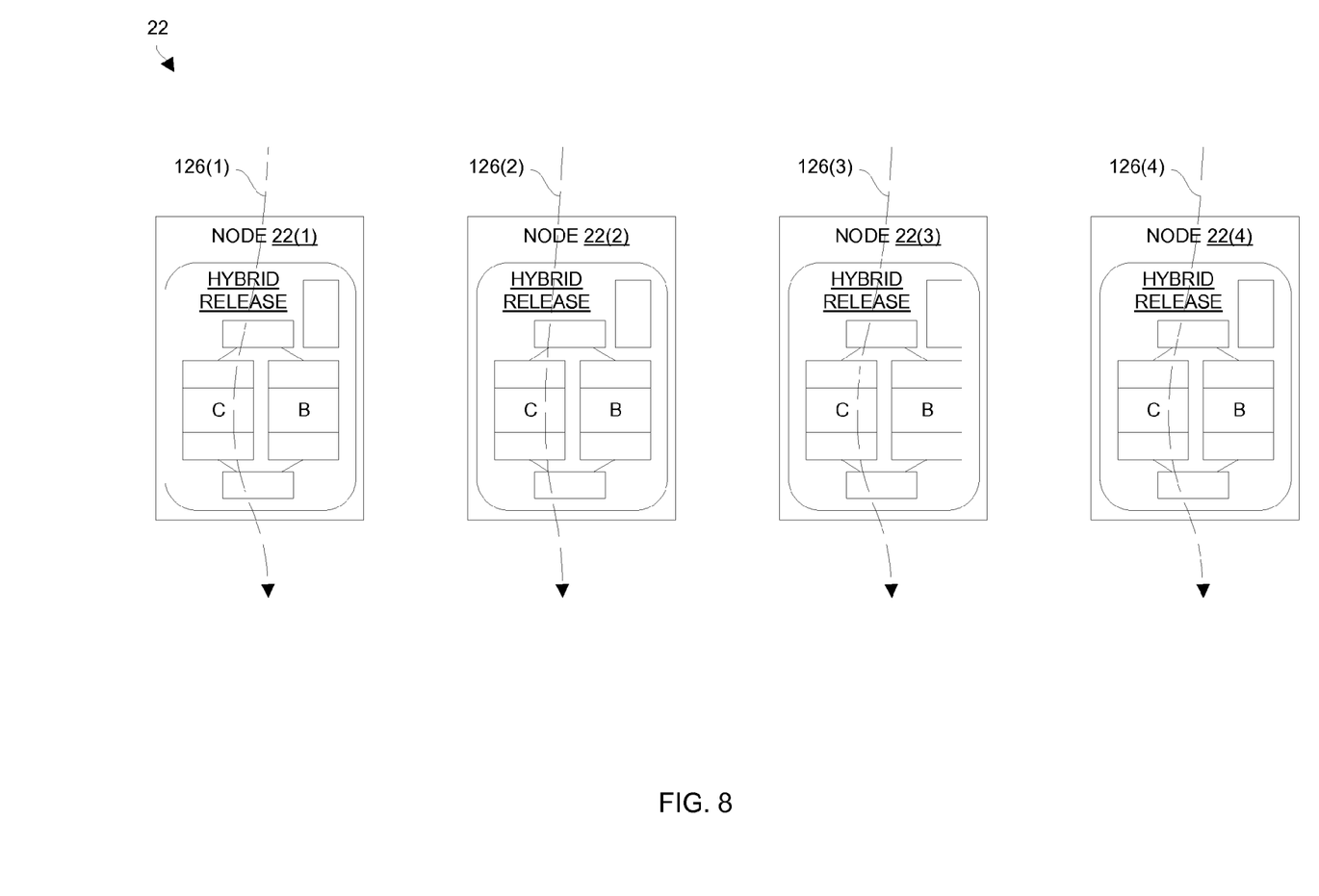
FIG. 8 is a block diagram showing the computerized nodes of the clustered storage system following a subsequent I/O stack only upgrade.

FIG. 8 illustrates the enhanced level of flexibility which is provided by the computerized nodes 22 when running the hybridized package 86 of the software (also see FIG. 3). For example, in the future, if there are upgrade changes that need to be made to the code for the I/O stack only, the entire hybridized software package 86 does not need to to be replaced. Rather, only the older, non-used I/O stack needs replacing.

Along these lines and as shown in FIG. 8, after the upgrade to the hybridized software package 86 is complete, the computerized nodes 22 are further upgraded to accommodate a new version protocol stack. Here, the "A-side" I/O stack in each computerized node 22 has been replaced with a new "C-side" I/O stack. In all other respects, the hybridized package 86 of the data storage software remains intact. This "I/O stack only" replacement process is performed on all computerized nodes 22 and then processing is switched to the "C-side" I/O stack on each computerized node 22 in a manner similar to that described above in connection with the "B-side" I/O stack and FIGS. 4 through 7. As a result, the "I/O stack only" upgrade provides new "C-side" I/O paths 126(1), 126(2), 126(3), 126(4) through the computerized nodes 22.

In some situations, the computerized nodes 22 can initially ship with hybridized software package 86 of the software already installed. In these situations, upgrading of the I/O stack code can simply take place, i.e., the membership portions, the multiplexer portions and the adapter portions remain intact as originally provided.

Figure 9:
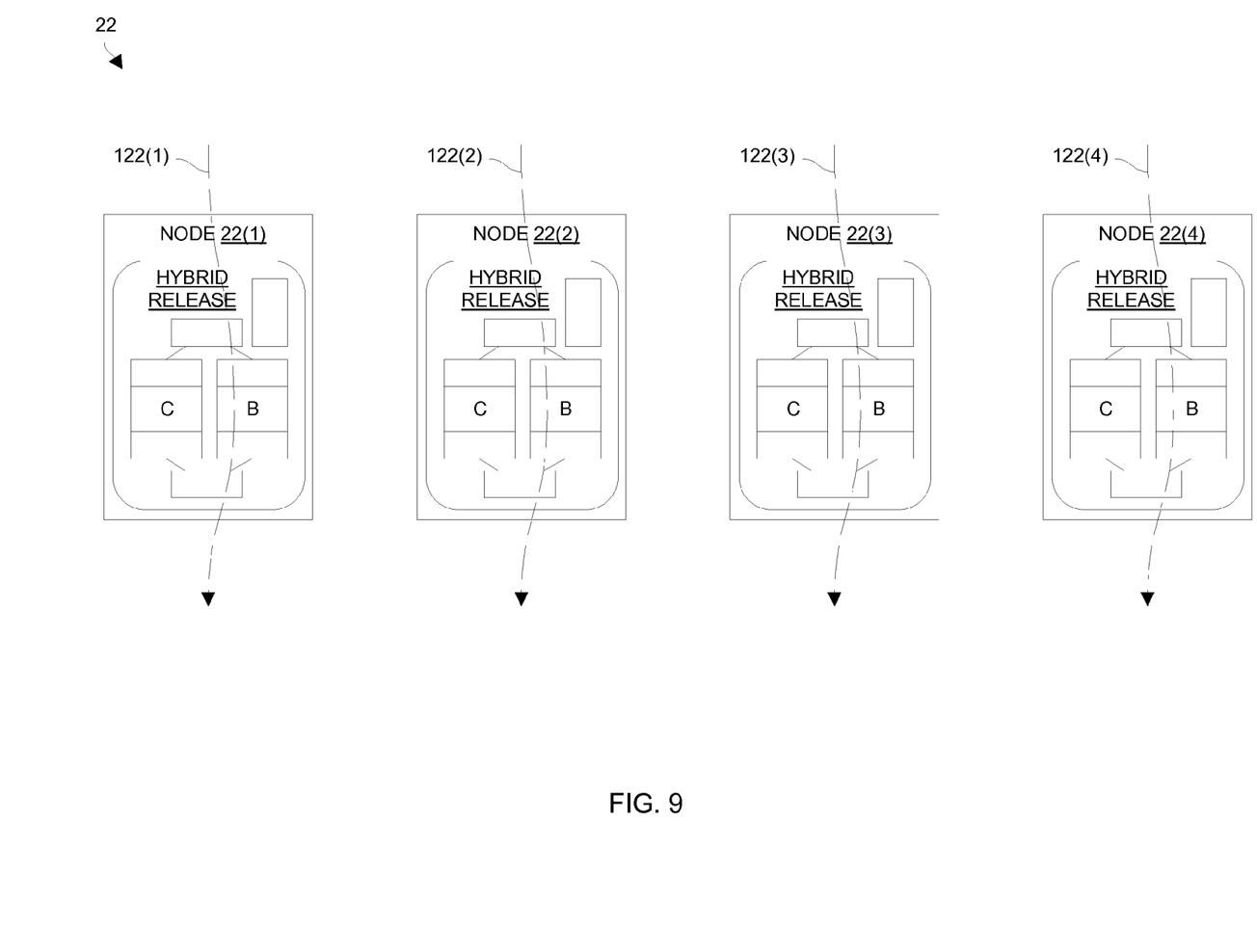
FIG. 9 is a block diagram showing the computerized nodes of the clustered storage system illustrating a feature of selectively steering (or routing) I/O requests from different hosts or host groups based on a steering command.

Another feature will be now be discussed in further detail with reference to FIGS. 8 and 9 together. As mentioned earlier, the clustered storage system 32 is capable of providing selective group-wise host I/O processing through different protocol stacks. Along these lines, suppose that each computerized node 22 of the system 32 has received a "C-side" protocol stack upgrade as shown in FIG. 8, but that all I/O processing for all host groups currently runs through the "B-side" protocol stack as shown in FIG. 9. Further suppose that the host device 24(1) belongs to a first group of host devices 24 and that the host device 24(2) belongs to a second group of host devices 24 (also see FIG. 1), and that it is desirable to transition only the second group of host devices 24 to the "C-side" protocol stack.

With the above-described situation in place, the system 32 is easily configurable so that the I/O requests 34 from the first group of host devices 24 (e.g., from the host device 24(1)) continue to be processed through the "B-side" protocol stack as shown in FIG. 9 (see paths 122(1), 122(2), 122(3), 122(4)). Additionally, in this situation, the I/O requests 34 from the second group of host devices 24 (e.g., from the host device 24(2)) can be transitioned through the "C-side" protocol stack as shown in FIG. 8. During this time period, the computerized nodes 22 process I/O requests 34 though both I/O stacks but, at no time, are the I/O requests 34 from any group serviced by different versions of the protocol stack.

It should be understood that the above-described group-wise host I/O request 34 processing can be effectuated via a group steering command (e.g., a user instruction, configuration information stored in the system 32, etc.). In response to the group steering command, the multiplexer portion of the data storage software in each node 22 essentially steers (or routes) I/O requests 34 to particular I/O stacks depending on which group of external host devices 24 provides the I/O requests 34.

As described above, improved techniques involve upgrading a computer using a hybridized software package 86 which is capable of running in accordance with either old processing features (e.g., an "A-side" protocol stack) or new processing features (e.g., a "B-side" protocol stack). In particular, once the hybridized software package 86 is installed on a computer, the computer can run the new "B" version or revert back to running the original "A" version. Additionally, in the context of data storage, the computer is capable of running the new "B" version for some external host devices 24, and the original "A" version for other external host devices 24 (e.g., on a per group basis). Moreover, the hybridized software package 86 is well-suited for safely and methodically upgrading a clustered storage system 32 of two or more computerized nodes 22 while the clustered storage system 32 as a whole remains online.

While various embodiments of the invention have been particularly shown and described, it will be understood by those skilled in the art that various changes in form and details may be made therein without departing from the spirit and scope of the invention as defined by the appended claims.

For example, it should be understood that in some arrangements the host-side storage fabric 26 and the array-side storage fabric 30 are exclusively block-based data transport mechanisms. Accordingly, the environment 20 is essentially a distributed storage area network (SAN).

In other arrangements, the fabrics 26, 30 are network-based data communications mechanisms (e.g., routers, switches, gateways, etc. running TCP/IP). In some arrangements, one or more portions of the fabrics 26, 30 is block-based and one or more portions of the fabrics 26, 30 is network-based.

Furthermore, it should be understood that the topology illustrated in FIG. 1 was provided by way of example only, and that other topologies are suitable for use as well. For example, a host device 24 may have a single path to a computerized node 22. Nevertheless, if the hybridized software package 86 is installed on that computerized node 22, the host device 24 enjoys high availability (i.e., receives service from the computerized node 22 without disruption during upgrading of the non-used I/O stack. Along these lines, the host device 24 is able to use "B-side" I/O stack (FIG. 7) while the "A-side" I/O stack is upgraded to the "C-side" I/O stack (FIG. 8).

Additionally, it should be understood that the topology shown in FIG. 1 was provided by way of example only and that other topologies are suitable for the environment 20 as well. For example, the environment 20 may have a ring-shaped topology, a hub-and-spoke topology, a backbone topology, an irregular topology, combinations thereof, and so on. Also, the fabrics 26, 30 may be tightly integrated and/or overlapping, i.e., a same fabric device carries both host-side and array-side communications.

Furthermore, it should be understood that the computerized nodes 22 were described as forming a clustered storage system 32 by way of example only. It should be understood that the above-described features and improvements may be applied to other types of systems as well such as general computer clusters, clustered websites, clustered database servers, and so on. Such modifications and enhancements are intended to belong to various embodiments of the invention.

What is claimed is:

1. A clustered storage system, comprising:
   computerized nodes constructed and arranged to receive input/output (I/O) requests from a set of external host devices and perform I/O operations based on the I/O requests, each computerized node further being constructed and arranged to:
   run a first package of software to process the I/O operations,
   during an installation period after running the first package of the software for a period of time, install a second package of the software in place of the first package of the software, the second package of the software including a first version side and a second version side, the second package of the software further including a multiplexing stage which is constructed and arranged to steer I/O operations to either the first version side or the second version side;
   after the installation period and prior to running the second version side of the second package of the software, receive a group steering command by the multiplexing stage of the second package of the software installed on that computerized node, and
   in response to the group steering command and completing processing of I/O requests started before receipt of the group steering command, steer, via the multiplexing stage of the second package of the software, (i) subsequent I/O requests received from a first group of external host devices only to the first version side of the second package of the software on that computerized node and (ii) subsequent I/O requests received from a second group of external host devices only to the second version side of the second package of the software on that computerized node, the first and second groups being non-overlapping,
   at least one computerized node of the cluster running (i) the first package of the software or (ii) the first version side of the second package of the software at all times during the installation period; and
   after the installation period, the second version side of the second package of the software running on each computerized node of the cluster.

2. A computerized device, comprising:
   a network interface constructed and arranged to provide external access to the computerized device, wherein the computerized device is a computerized node of a cluster which operates as a clustered storage system, each computerized node of the cluster being constructed and arranged to receive input/output (I/O) requests from a set of external host devices and perform I/O operations based on the I/O requests;
   memory which initially stores a first package of software; and
   processing circuitry coupled to the network interface and the memory, the processing circuitry being constructed and arranged to:
   run the first package of the software,
   during an installation period and after running the first package of the software for a period of time, receive a second package of the software through the network interface and install the second package of the software in the memory in place of the first package of the software, the second package of the software including a first version side and a second version side, the second package of the software further including a multiplexing stage which is constructed and arranged to steer I/O operations to either the first version side or the second version side,
   after the installation period and prior to running the second version side of the second package of the software, receive a group steering command by the multiplexing stage of the second package of the software installed on that computerized node,
   in response to the group steering command and completing processing of I/O requests started before receipt of the group steering command, steer, via the multiplexing stage of the second package of the software, (i) subsequent I/O requests received from a first group of external host devices only to the first version side of the second package of the software on that computerized node and (ii) subsequent I/O requests received from a second group of external host devices only to the second version side of the second package of the software on that computerized node, the first and second groups being non-overlapping, and
   after the installation period, run the second version side of the second package of the software.

3. A computerized device as in claim 2,
   wherein the processing circuitry is further constructed and arranged to (i) receive a first version side command during the installation period and (ii) steer, via the multiplexing stage of the second package of the software installed in the memory, new I/O requests received from the set of external host devices only to the first version side of the second package of the software installed in the memory in response to the first version side command.

4. A computerized device as in claim 3 wherein the processing circuitry, when running the second version side of the second package of the software after the installation period, is constructed and arranged to:
   receive a second version side command, and
   steer, via the multiplexing stage of the second package of the software installed on that computerized node, all subsequent I/O requests received from the set of external host devices only to the second version side of the second package of the software in response to the second version side command.

5. A computerized device as in claim 2 wherein the processing circuitry, when running the second version side of the second package of the software, is constructed and arranged to:
   receive another command, and
   in response to the other command, steer, via the multiplexing stage of the second package of the software, further I/O requests received from the first group of external host devices only to the second version side of the second package of the software on that computerized node.

6. A computerized device as in claim 3 wherein the processing circuitry, when steering the new I/O requests, is constructed and arranged to:
channel block-based data access requests from the set of external host devices to the first version side of the second package of the software and not to the second version side of the second package of the software.

7. A computerized device as in claim 6 wherein the first version side of the second package of the software includes a first I/O stack having a first front-end stage to interface with the set of external host devices, a first back-end stage to interface with a data storage array, and a first data-management stage which connects the first front-end stage with the first back-end stage;
wherein the second version side of the second package of the software includes a second I/O stack having a second front-end stage to interface with the set of external host devices, a second back-end stage to interface with the data storage array, and a second data-management stage which connects the second front-end stage with the second back-end stage;
wherein the multiplexer stage of the second package of the software is separated but linked to the first I/O stack and the second I/O stack; and
wherein the clustered storage system includes at least two computerized nodes to receive I/O requests and perform I/O operations based on the I/O requests, the computerized nodes mirroring, among each other, cached data written by the set of external host devices.

8. A method of upgrading software running on a cluster of computerized nodes, the method comprising:
running a first package of the software on each computerized node of the cluster, wherein the cluster of computerized nodes is a clustered storage system, each computerized node of the cluster being constructed and arranged to receive input/output (I/O) requests from a set of external host devices and perform I/O operations based on the I/O requests;
during an installation period and after running the first package of the software on each computerized node of the cluster for a period of time, installing a second package of the software on each computerized node of the cluster in place of the first package of the software, the second package of the software installed on each computerized node of the cluster including a first version side, a second version side, and a multiplexing stage for steering I/O operations which are directed to the multiplexing stage to either the first version side or the second version side of the second package of the software installed on that computerized node, at least one computerized node of the cluster running (i) the first package of the software or (ii) the first version side of the second package of the software at all times during the installation period;
after the installation period and prior to running the second version side of the second package of the software on each computerized node of the cluster, receiving a group steering command by the multiplexing stage of the second package of the software installed on that computerized node,
in response to the group steering command, steering, by the multiplexing stage of the second package of the software installed on that computerized node, (i) all subsequent I/O requests received from a first group of external host devices only to the first version side of the second package of the software on that computerized node and (ii) all subsequent I/O requests received from a second group of external host devices only to the second version side of the second package of the software on that computerized node, the first and second groups being non-overlapping, and
after the installation period, running the second version side of the second package of the software on each computerized node of the cluster.

9. A method as in claim 8,
further comprising, for each computerized node of the cluster, (i) receiving a first version side command by the multiplexing stage of the second package of the software installed on that computerized node and (ii) steering, by the multiplexing stage of the second package of the software installed on that computerized node, new I/O requests received from the set of external host devices only to the first version side of the second package of the software installed on that computerized node in response to the first version side command.

10. A method as in claim 9 wherein, after the installation period, running the second version side of the second package of the software on each computerized node of the cluster includes, for each computerized node of the cluster:
receiving a second version side command by the multiplexing stage of the second package of the software installed on that computerized node, and
steering, by the multiplexing stage of the second package of the software installed on that computerized node, subsequent I/O requests received from the set of external host devices only to the second version side of the second package of the software in response to the second version side command.

11. A method as in claim 9 wherein running the second version side of the second package of the software on each computerized node of the cluster includes, for each computerized node of the cluster:
receiving another command by the multiplexing stage of the second package of the software installed on that computerized node, and
in response to the other command, steering, by the multiplexing stage of the second package of the software installed on that computerized node, further I/O requests received from the first group of external host devices only to the second version side of the second package of the software on that computerized node.

12. A method as in claim 9 wherein running the first version of the software on each computerized node of the cluster includes:
running, as the first package of the software on each computerized node of the cluster, a legacy release of the software which is non-multiplexing to different version sides.

13. A method as in claim 9, further comprising:
after running the second version side of the second package of the software on each computerized node of the cluster, running the first version side of the second package of the software on each computerized node of the cluster to revert operation back to a previous version of an I/O protocol stack.

14. A method as in claim 9, further comprising:
while running the second version side of the second package of the software on each computerized node of the cluster, installing a third version side in place of the first version side of the second package of the software installed on each computerized node, the multiplexer stage and the second version side of the second package of the software on that computerized node remaining intact after the third version side is installed in place of the first version side of the second package of the software installed on that computerized node.

15. A method as in claim 9 wherein, for each computerized node of the cluster, steering the new I/O requests received from the set of external host devices only to the first version side of the second package of the software includes:
channeling block-based data access requests from the set of external host devices to the first version side of the second package of the software and not to the second version side of the second package of the software.

16. A method as in claim 15 wherein, for each computerized node of the cluster:
the first version side of the second package of the software includes a first I/O stack having a first front-end stage to interface with the set of external host devices, a first back-end stage to interface with a data storage array, and a first data-management stage which connects the first front-end stage with the first back-end stage, and
the second version side of the second package of the software includes a second I/O stack having a second front-end stage to interface with the set of external host devices, a second back-end stage to interface with the data storage array, and a second data-management stage which connects the second front-end stage with the second back-end stage.

17. A method as in claim 16 wherein, for each computerized node of the cluster:
the multiplexer stage of the second package of the software is separated but linked to the first I/O stack and the second I/O stack.

18. A method as in claim 16 wherein the clustered storage system includes at least two computerized nodes to receive I/O requests and perform I/O operations based on the I/O requests, the computerized nodes mirroring, among each other, cached data written by the set of external host devices.

19. A method as in claim 8, further comprising running the installed second package of the software on one of the computerized nodes, the running second package of the software realizing:
a multiplexing stage for receiving input/output (I/O) requests from an external host device,
a first protocol stack, operatively coupled to the multiplexing stage, for processing I/O requests in accordance with the first side version,
a second protocol stack, operatively coupled to the multiplexing stage, for processing I/O requests in accordance with the second side version, and
an adapter, operatively coupled to the first protocol stack, the second protocol stack, and an external storage array, for receiving processed I/O requests from the first protocol stack and the second protocol stack and conveying the processed I/O requests to the external storage array,
wherein the multiplexing stage sends I/O requests to the first protocol stack in response to a first command and sends I/O requests to the second protocol stack in response to a second command.

20. A method as in claim 19, further comprising:
receiving, by the adapter, data from the external storage array in response to an I/O request requesting data from the external storage array;
processing the received data with the first protocol stack if the I/O request was processed by the first protocol stack, or processing the retrieved data with the second protocol stack if the I/O request was processed by the second protocol stack; and
transmitting the processed received data, via the multiplexor, to the external host device.

* * * * *